United States Patent
Taglialatela-Scafati et al.

(10) Patent No.: US 7,251,990 B2
(45) Date of Patent: Aug. 7, 2007

(54) METHOD AND A RELATIVE DEVICE FOR DIAGNOSING MISFIRE OR PARTIAL COMBUSTION CONDITIONS IN AN INTERNAL COMBUSTION ENGINE

(75) Inventors: Ferdinando Taglialatela-Scafati, Giugliano (IT); Nicola Cesario, Casalnuovo di Napoli (IT); Giovanni Di Lorenzo, Caserta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 11/367,806

(22) Filed: Mar. 3, 2006

(65) Prior Publication Data

US 2006/0230821 A1    Oct. 19, 2006

(30) Foreign Application Priority Data

Mar. 4, 2005  (EP)  ................................. 05425121
Mar. 1, 2006  (EP)  ................................. 06110565

(51) Int. Cl.
*G01M 15/00*  (2006.01)
(52) U.S. Cl. .................................... 73/117.3
(58) Field of Classification Search ................. 73/112, 73/115, 116, 117.2, 117.3, 118.1
See application file for complete search history.

(56) References Cited

U.S. PATENT DOCUMENTS

| | | | |
|---|---|---|---|
| 5,093,792 A | 3/1992 | Taki et al. | 364/431.01 |
| 5,878,717 A | 3/1999 | Zur Loye | 123/435 |
| 7,079,936 B2* | 7/2006 | Honda | 701/102 |
| 2003/0010101 A1 | 1/2003 | Zur Loye et al. | 73/116 |
| 2005/0166665 A1* | 8/2005 | Honda | 73/35.12 |
| 2006/0129307 A1* | 6/2006 | Yasui | 701/114 |
| 2006/0212209 A1* | 9/2006 | Cesario et al. | 701/106 |
| 2006/0217872 A1* | 9/2006 | Moriya et al. | 701/114 |

FOREIGN PATENT DOCUMENTS

| | | |
|---|---|---|
| EP | 1375890 | 1/2004 |
| JP | 59221433 | 12/1984 |
| WO | WO2004048761 | 6/2004 |

OTHER PUBLICATIONS

"Cylinder Air/Fuel Ratio Estimation Using Net Heat Release Data", Tunestal et al; IFAC Workshop on Advances in Automotive Control, Mar. 28, 2001, pp. 239-247, XP001032740.

"Cylinder Air/Fuel Ratio Estimation Using Net Heat Release Data", Tunestal et al; Control Engineering Practice, Pergamon Press, Oxford, GB, vol. 11, No. 3, 2003, pp. 311-318, XP001157572, ISSN: 0967-0661.

Patent Abstracts of Japan, vol. 011, No. 208, Jul. 7, 1987 & JP62030932, Feb. 9, 1987.

* cited by examiner

*Primary Examiner*—Eric S. McCall
(74) *Attorney, Agent, or Firm*—Lisa K. Jorgenson; Allen, Dyer, Doppelt, Milbrath & Gilchrist, P.A.

(57) ABSTRACT

A method of diagnosing misfire or partial combustion conditions in an internal combustion engine without using a phonic wheel discriminates the combustion conditions with soft-computing techniques directly exploiting a combustion pressure signal generated by a common pressure sensor installed in the cylinder. There exists an exploitably close correlation between the instantaneous values of the internal cylinder pressure and the occurrence of misfire or partial combustion conditions, and thus the cylinder pressure signal may be reliably used for diagnosing misfires or partial combustions in functioning conditions of the engine.

14 Claims, 6 Drawing Sheets

METHOD AND A RELATIVE DEVICE FOR DIAGNOSING MISFIRE OR PARTIAL COMBUSTION CONDITIONS IN AN INTERNAL COMBUSTION ENGINE

FIELD OF THE INVENTION

This invention relates to internal combustion engines, and, more particularly, to a method and associated device for diagnosing misfire or partial combustion conditions in an internal combustion engine.

BACKGROUND OF THE INVENTION

A misfire condition (missed internal combustion) of an internal combustion engine, is generally due to the fact that fuel is not injected into the cylinder due to malfunctioning of the injector or the air/fuel mixture does not ignites because of malfunctioning of spark plugs, in spark ignition engines. Besides these misfire conditions, an incomplete (partial) combustion or lack of combustion may take place even for other causes, such as when the air/fuel mixture is excessively lean, or when the air/fuel mixture is excessively diluted with large amounts of exhaust gases.

These malfunctioning conditions, that foster misfire or partial combustion, generally occur when the engine is at idle and during fast changes of regime. For example, when the engine is decelerating, the injected fuel is diluted by exhaust gas of the previous cycle and the probability of occurrence of a misfire condition increases.

Notably, in spark ignition engines, to reduce the maximum firing temperature for reducing the formation of nitride oxides, often the expedient used is to dilute the injection mixture with aspired exhaust gas. This common technique, called Exhaust Gas Recirculation (or more briefly EGR), depending on the value of certain parameter of the engine (load, engine speed and the like) actuates a variable opening of an exhaust gas recirculation valve, and, thus, causes a different dilution of the air/fuel mixture. In particular conditions, an excessive dilution of the injection mixture may favor the occurrence of partial combustion or misfire.

Therefore, with high percentages of recirculated gases (high percentages of EGR), partial combustions and misfires are likely to occur more often.

It is also possible to have misfire or partial combustion of the air/fuel mixture because of faulty functioning of the lambda sensor and/or of the associated feedback control of the air/fuel ratio of the engine. There may be an excessively lean mixture with a consequent greater probability of misfires and partial combustions.

These phenomena may significantly limit the performance of the engine both in terms of power and of the amounts of emitted pollutants. Indeed, in the presence of misfire and/or partial combustion, the running of the engine becomes irregular, with undesired torque variations, loss of efficiency and a strong increase of the emissions of unburned hydrocarbons in the exhaust gases.

Misfires, in particular, besides reducing engine performance and increasing emissions of hydrocarbons, may damage the catalytic converter. Indeed, because of the high temperature in the catalytic converter (around 450° C.) following a misfire, the unburned mixture may ignite itself in the catalytic converter and damage it.

Identifying and analyzing the causes that may lead to misfires and partial combustion in spark ignition engines is important in engine control systems.

An effective control of partial combustion and an accurate identification and limitation of misfire events would permit improved performance of internal combustion engines and would reduce emissions of unburned hydrocarbons and prolong the life of the catalytic converter. Diagnosing misfire conditions is even required by certain regulations (EOBD, OBD II, etc.) relating to onboard diagnostic systems.

Generally, misfire conditions are diagnosed in many engines, by using speed sensors installed close to the crankshaft for sensing the occurrence of misfires by detecting variations of the angular speed of the crankshaft. Generally, a misfire condition is diagnosed by measuring the time duration of pulses of a phonic wheel of the engine: misfire events cause an abrupt deceleration of the rotation of the crankshaft, and as a consequence they abruptly increase the duration between two successive pulses of the phonic wheel.

This method of diagnosing a misfire condition has drawbacks due essentially to possible alterations of the motion unrelated to misfire conditions and limitations due to fabrication tolerances of the phonic wheel.

For example, a rough road on which a vehicle is running may influence the angular speed of its engine, and this is likely to cause spurious identification of misfires.

In order to address these problems, complex hardware and software are generally required for filtering data relating to the angular speed of the engine or as an alternative misfire diagnosis is momentarily disabled.

An alternative and more effective method of diagnosing misfires is based on the analysis of the pressure signal in the combustion chamber. In this case, the pressure signal is acquired by using a pressure sensor installed directly in the combustion chamber. Diagnosing misfire conditions with this technique has innumerable advantages with respect to other techniques commonly implemented in the ECU of engines and based substantially on the analysis of the angular speed of the engine.

One of the most important advantages of exploiting a pressure signal compared to analyzing the angular speed of the engine, is that eventual disturbances of the motion (torsional oscillations of the drive shaft and of the transmission gear, irregularities of the road, and so on) and eventual errors introduced by the phonic wheel do not affect the diagnosis of a misfire condition.

The indicated mean effective pressure (or more briefly IMEP) is the parameter of the pressure cycle that is more frequently used for identifying misfire phenomena. In a cycle in which a misfire takes place, the IMEP is negative (and also the torque). Unfortunately, calculation of this parameter is onerous because the IMEP is proportional to the integral along the whole pressure-volume cycle of the pressure with respect to the volume.

SUMMARY OF THE INVENTION

A reliable and convenient alternative method of diagnosing misfire or partial combustion conditions in an internal combustion engine without using a phonic wheel and an associated diagnosis unit that implements the method have been found. According to the present invention, the combustion conditions are discriminated with soft-computing techniques directly exploiting a combustion pressure signal generated by a common pressure sensor installed in the cylinder.

The applicants have found that there exists an exploitably close correlation between the instantaneous values of the internal cylinder pressure and the occurrence of misfire or partial combustion conditions, and thus the cylinder pressure signal may be reliably used for diagnosing misfires or partial combustions in any functioning condition of the engine. Therefore, phonic wheels installed on the drive shaft may no longer be required nor may it be necessary to disable the diagnosis unit when the vehicle is running on a rough road or during transient conditions.

Also, differently from the known alternative systems based on the IMEP parameter, the diagnosis device is faster than the known devices because it may not be necessary to calculate the IMEP parameter for identifying a misfire condition.

The diagnosis device may be used for realizing a controller for an internal combustion engine. The method may even be carried out by a software code executed by a computer or by an ECU (Engine Control Unit).

BRIEF DESCRIPTION OF THE DRAWINGS

The invention will be described referring to the attached drawings, wherein:

FIG. 6 shows four different ways of clustering the set of FIG. 4a;

DETAILED DESCRIPTION OF THE PREFERRED EMBODIMENTS

Figure 9:
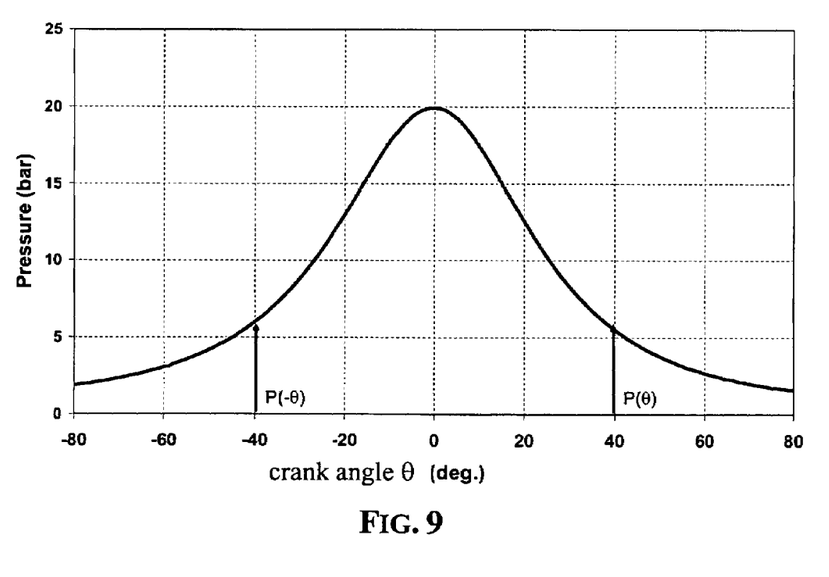
FIG. 9 depicts a pressure cycle during a misfire condition.

In presence of misfires, it is possible to diagnose the existence of a misfire condition from analyzing the pressure cycle in the combustion chamber, as shown in FIG. 9. Indeed, the pressure cycle in this situation is similar to that when the engine is "dragged", that is when the internal combustion engine is moved by an electrical motor. In such a pressure cycle, the ratio between the measured pressures at symmetrical angles in respect to the PMS is always smaller than one.

A way of diagnosing a misfire condition by monitoring the pressure cycle consists in detecting the condition expressed by the following inequality:

$$\frac{P(\theta)}{P(-\theta)} < 1$$

wherein P is the pressure in the combustion chamber and $\theta$ is the crank angle in respect to the position at which the TDC (Top Dead Center) normally occurs. The above inequality is not verified in case of a normal or partial combustion.

Figure 8:
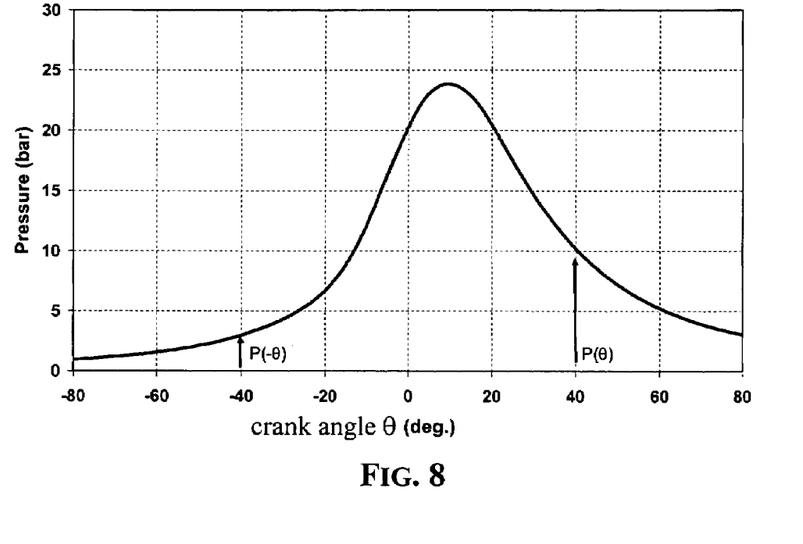
FIG. 8 depicts a pressure cycle during a partial combustion condition.

In case of a partial combustion, the pressure cycle, a sample of which is depicted in FIG. 8, assumes a "deformed" shape and the pressure peak shifts to the right.

According to the method of this invention, the ratio $P(\theta)/P(-\theta)$ is monitored for diagnosing an occurred misfire or a condition of partial combustion. It has been found that when this ratio becomes larger than a pre-established threshold, it may be reliably assumed that a partial combustion is taking place in the cylinder and thus appropriate control actions may be carried out for correcting this undesired condition.

Figure 1:
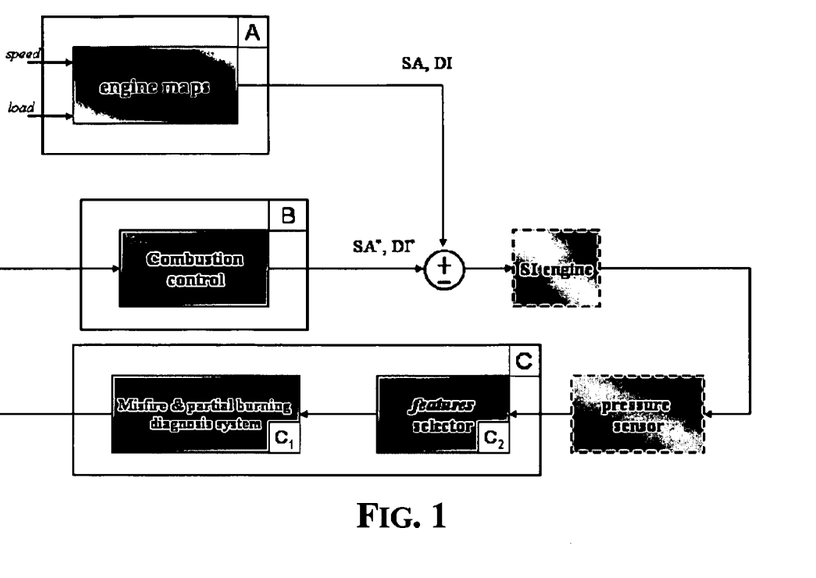
FIG. 1 shows a feedforward-and-feedback control system of this invention that uses a device of this invention for diagnosing misfire or partial combustion or normal combustion conditions of the engine.

FIG. 1 depicts a block diagram of a feedback-and-feedforward control system of this invention for an internal combustion engine.

This control system includes a feedforward controller A, a pressure sensor, a feedback controller B and the diagnosis unit C that generates a signal representative of a misfire condition or of a partial combustion condition by analyzing pressure signal generated by a pressure sensor installed in a combustion chamber of a cylinder of the engine.

The feedforward controller A is input with signals representative of the speed and of the load of the engine, and outputs a signal DI, that establishes the duration of the fuel injection pulse and a spark generation control signal SA, that determines the spark-advance. The levels of these signals DI and SA are calculated by the feedforward controller A as a function of the current speed and load of the engine using a predetermined model of the engine (engine maps).

The feedback controller B generates feedback signals DI* and SA* for correcting the calculated fuel injection duration and spark advance, represented by the signals DI and SA, respectively, as a function of the signal generated by the diagnosis unit C.

Should a misfire condition be diagnosed for a certain number of consecutive cycles (for example for as long as 10 cycles), the feedback controller may generate a warning to the driver and then may even cut the fuel in order to avoid damages to the catalytic converter.

The diagnosis unit C substantially comprises a block C2 that generates signals representative of values of the ratio $P(\theta)/P(-\theta)$ by sampling the pressure signal P in correspondence with different crank angles $\theta$ and of a block C1, that decides whether the engine is in a misfire condition or in a partial combustion condition or is functioning normally.

Feedforward Controller A

This block generates the signals SA and DI as a function of the speed and load of the engine by using control maps of the engine. In practice, according to a common control technique, a mathematical model of the functioning of the engine is determined during a test phase in order to determine, for any pair of values of speed and load of the engine, the best values of the duration of the fuel injection and the spark-advance of the engine.

The optimal duration of the fuel injection is that corresponding to the condition $\lambda=1$. In practice, the feedforward controller A compares the input values of speed and load with those stored in a look-up table generated during a test phase of the engine, and outputs the signals DI and SA of corresponding values. When the input values of the speed and load do not correspond to any pair of the look-up table, the feedforward controller A calculates the levels of the signals DI and SA by linear interpolation.

It should be stressed that: the best fuel injection duration, for a pair of input values of the speed and load not contemplated in the look-up table, could differ from the value obtained by linear interpolation because an engine is a nonlinear system; and the test phase is carried out under certain pressure and temperature conditions that may differ sensibly from real working conditions of the engine.

Therefore, the calculated duration of fuel injection represented by the signal DI is corrected by a feedback signal DI* that is conditioned by a diagnostic signal, asserting a misfire, a partial combustion or a normal functioning condition of the engine.

Diagnosis unit C

In detail, the diagnosis unit C includes a subsystem C2 FEATURE SELECTOR that extracts from the combustion pressure cycle at least one operation parameter sufficient for diagnosing the functioning of the engine.

Tests carried out by the applicant showed that the parameter that has proven to be the most indicative for discriminating the functioning conditions of the engine is the ratio $P(\theta)/P(-\theta)$, wherein P is the combustion pressure and $\theta$ is the crank angle from the Top Dead Center.

Preferably, the subsystem C2 receives as input information the pressure signal generated by the pressure sensor fitted in at least one cylinder of the engine and generates from this signal the values of the pressure ratios $P(\theta_i)/P(-\theta_i)$ measured at predefined crank angles $\theta_i$ that, in a preliminary test phase, have been identified as discriminating among the different functioning conditions of the engine.

The core C1 is, from a mathematical point of view, similar to a classifier that provides, as a function of the ratios detected at different crank angles, a qualitative evaluation relative to the current combustion condition. In practice, the block C1 associates with the values of the above ratios a class indicating if the combustion process is normal (class 1) or if partial combustion (class 2) or misfire (class 3) events occurred.

The core C1 of the diagnosis unit analyzes, during a certain number of pressure cycles, the values of the ratio $P(\theta)/P(-\theta)$ in correspondence of predefined crank angles. The n values of the pressure ratios measured in each pressure cycle identify a corresponding point of a n-dimensional space. The functioning of the engine is observed for a certain number of consecutive pressure cycles and a corresponding number of points are located.

These points are grouped together with a clustering algorithm executed by the core C1, such as for example the Fuzzy Probabilistic C-Means or any other appropriate clustering algorithm, for example one of those described in the prior European Patent application No. 05,425,121.0 of the same applicant, thus identifying a number of clusters.

Since at most three different functioning conditions may be identified, the number of clusters to be identified by the clustering algorithm is not greater than three in the illustrated embodiment.

The best clustering of these points performed by the C1 block, that is the best number of clusters is determined by evaluating a clustering performance index as described in the cited prior European Patent application No. 05,425,121.0. A brief introduction to clustering algorithms and to the clustering performance index is provided later.

The core C1 executes the clustering algorithm, identifies the number of clusters that maximize the clustering performance index and decides whether, during the observed pressure cycles, only normal combustion conditions have occurred or not and the type of non-normal combustion process that has occurred.

This is carried out through the following operations: pre-establishing three disjoint ranges of positive real numbers; the points of the n-dimensional space are clustered at most in three different clusters, such to maximize the performance index; the center of gravity of each cluster is located; for each center of gravity, the arithmetic mean of the n components thereof is calculated; and if the arithmetic mean is contained in the first or second or third pre-established range, the relative cluster corresponds to normal combustion or partial combustion or misfire conditions, respectively.

Figure 2:
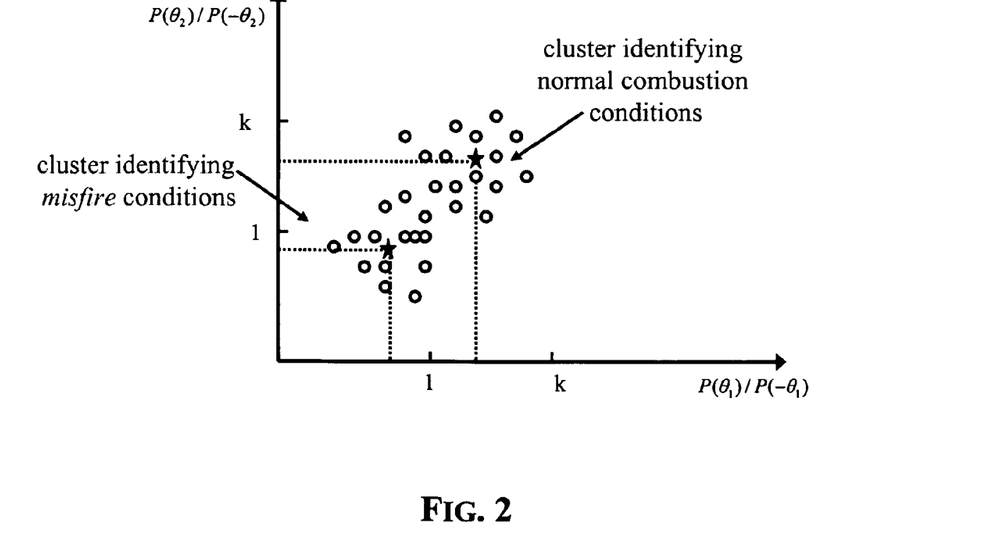
FIG. 2 shows two sample clusters used for diagnosing a misfire or a partial combustion condition.

For sake of example, let us suppose that only two clusters have been identified, as shown in FIG. 2, one corresponding to misfire conditions and the other corresponding to normal functioning condition. Since the arithmetic mean of the two components of the center of gravity of the leftmost cluster and of the rightmost cluster found by the C1 block, are comprised in [0, 1] and in [1, k], respectively, then the diagnosis unit signals that during the observed pressure cycles misfire conditions and normal combustion conditions have occurred.

Typically, also for n-dimensional spaces, clusters for which the arithmetic mean of the n components of their center of gravity is comprised between 0 and 1, correspond to misfire conditions, clusters for which the arithmetic mean of the n components of their center of gravity is comprised between 1 and a pre-fixed threshold k represent normal functioning conditions, and clusters for which the arithmetic mean of the n components of their center of gravity is larger than k represent partial combustion conditions.

The threshold k may be adjusted during a preliminary test phase of the engine. The core of diagnosis unit may either be a neural network, a fuzzy system or any other learning machine.

Clustering of M-Dimensional Data

There are two kinds of data distributions that can be clustered: data sequences and data ensembles. Data sequence means data come from a temporal sampling, e.g. a signal temporal sampling, or also the temporal sequence of engine pressure cycles. On the other hand, data ensemble means data (in an M-dimensional space) that are not temporally linked.

There are several clustering algorithms [1], for each of them there is a different approach to find the "optimal data clustering".

Let a data set of N points in the space $R^m$, $X=X_1, \ldots, X_N$, clustering of X involves a "natural" partition of the ensemble in $1<c<N$ sub-structures. There are three different ways to obtain these c sub-structures in a given data set. Each way defines suitably the membership matrix (c×N matrix) of X elements versus c clusters. The membership matrix is built by the c×N matrix $U_{ik}$ being $k=1, \ldots, N$ and $i=1, \ldots, c$.

$U_{ik}$ elements are suitably linked to the distances of X points from c temporary cluster centers.

$$M_P = \{0 \leq U_{ik} \leq 1 \forall i, k \ \forall k \exists i | U_{ik} > 0\} \quad (1)$$

$$M_F = \left\{ \sum_{i=1}^{c} U_{ik} = 1 \forall k \sum_{k=1}^{N} U_{ik} > 0 \ \forall i \right\} \quad (2)$$

$$M_C = \{U_{ik} = 0 \text{ or } 1 \ \forall i, k\} \quad (3)$$

The equations (1), (2) e (3) describe the three feasible membership matrices. In $M_p = M_{possibilistic}$, $U_{ik}$ element is the possibility (typicality) that $x_k$ point belongs to the i-th sub-structure. In $M_F = M_{fuzzy}$, $U_{ik}$ element corresponds to the membership probability of $x_k$ point to the i-th sub-structure; these probabilities satisfy for each k a normalization condition. Finally, $M_C = M_{crisp}$ is a Boolean matrix in which each element $U_{ik} = 1$ if and only if $X_k$ belongs to the current sub-structure. The three matrices are related by the following relation:

$$M_{crisp} \subset M_{fuzzy} \subset M_{possibilistic} \qquad (4)$$

Finding the "optimal partition" of a data set X means to find the matrix $U_{ik}$ which better represents the unknown sub-structures of X in comparison to the clustering model that the algorithm induces.

Generally speaking, clustering algorithms are subdivided into two main groups: "hard" and "soft". In "hard" clustering algorithms, each vector belongs only to a single cluster (that is clusters are disjoint), while in "soft" clustering algorithms each vector may belong to more clusters with different fuzzy degrees.

For a data set clustering, some criteria to appraise it need to be introduced.

Moreover, other criteria are needed in order to find which strategies should be followed for improving the clustering. Concerning the first of these requisites, there are not objective criteria to appraise a data set clustering; in fact, the current criteria depend on the application.

Figure 3:
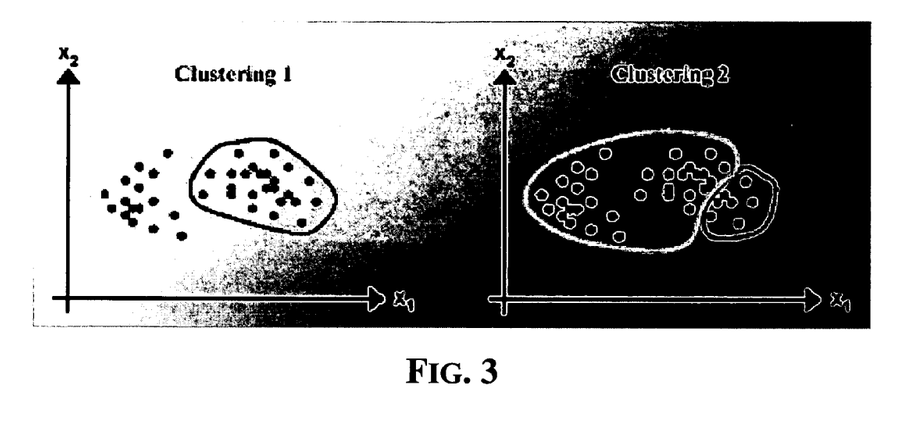
FIG. 3 shows a sample set of bi-dimensional data clustered in two different ways.

For example, FIG. 3 shows a sample set of bi-dimensional data clustered in two different ways. For the considered sample set, a good clustering algorithm should identify the two clusters of the example CLUSTERING1.

To improve a data set clustering, the most common approach is based on an iterative solution searching. An exhaustive solution searching, in the space of the possible solutions, could be too onerous from a computational viewpoint. Indeed, the total number of partitions in c classes of a data set with N elements is $C^N/c!$. A sub-optimal approach allows for each iteration to improve the solution going to optimize the selected criterion.

Even if the approach does not guarantee the attainment of the absolute optimal solution, it is often used because of its low computational complexity. However, a relevant problem of these approaches is the sensibility to the initial choosing of the clusters.

A satisfactory clustering algorithm for the objectives of this invention is the FCM (Fuzzy C-Means).

Fuzzy C-Means Algorithm (FCM)

The FCM algorithm is based on Fuzzy System Theory which is used as an invaluable mathematical tool in many application fields. A fuzzy set is an element set with a "blurred" membership concept. FCM is an iterative procedure based on the idea that clusters can be handled as fuzzy sets. Each point $X_k$ (with $k=1, \ldots, N$) may belong at the same time to different clusters with membership degrees $U_{kj}$ (with $j=1, \ldots, c$) which change during the procedure. There is only a constraint: for each element $x_k$ and for each algorithm step, the sum of membership degrees must be equal to 1.

Figure 4A:
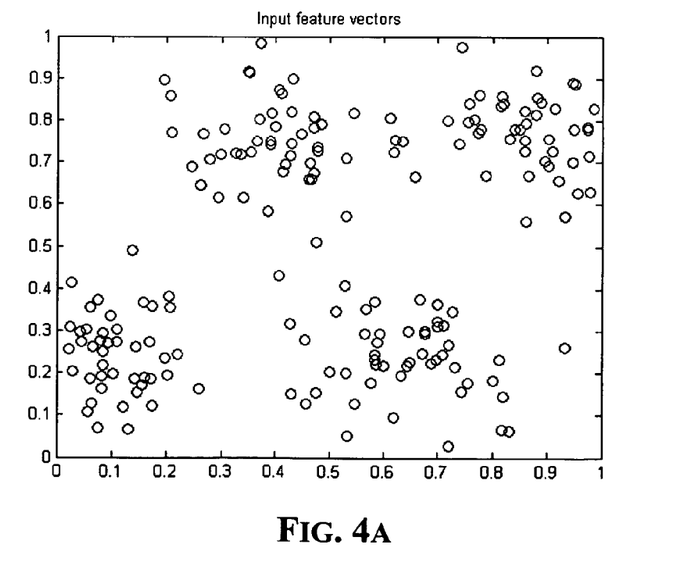
FIG. 4a shows a sample set of bi-dimensional data to be clustered.
Figure 4B:
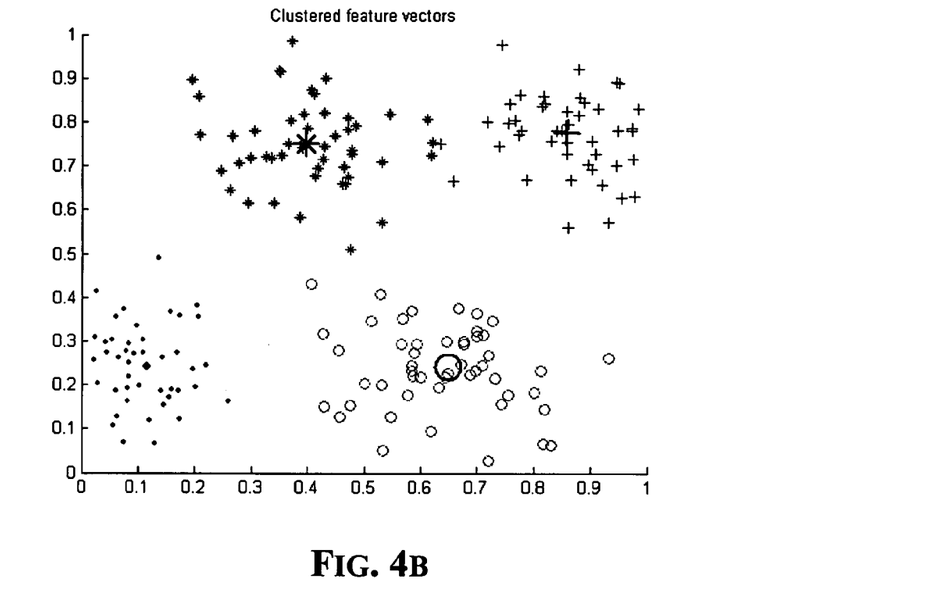
FIG. 4b shows the set of FIG. 4a clustered into four clusters.

FIGS. 4a and 4b depict a set of bi-dimensional data before clustering them and after having executed a FCM algorithm, respectively, that grouped them into four clusters.

Figure 5:
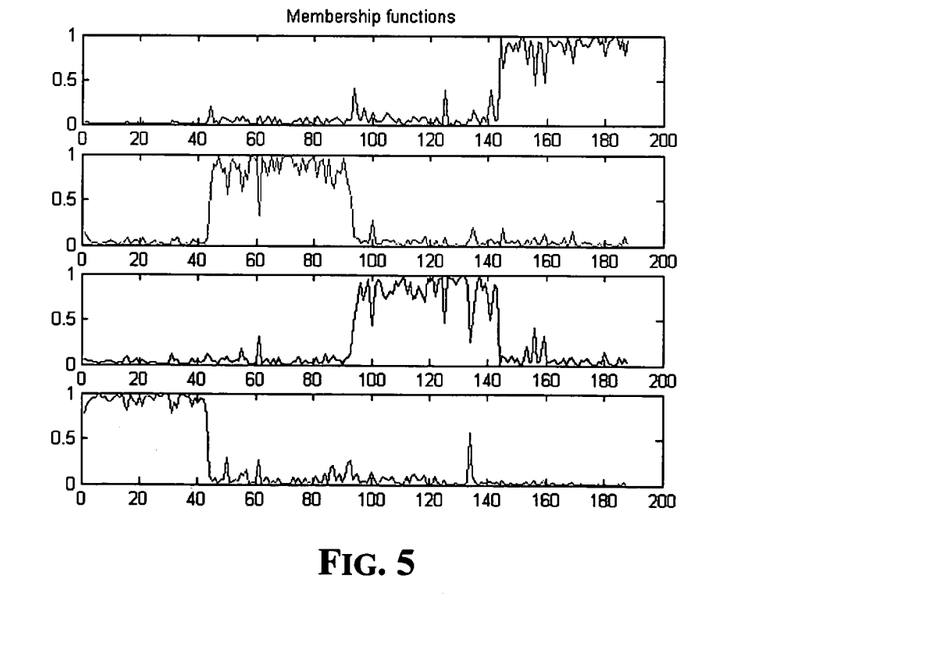
FIG. 5 depicts the graphs of the membership functions of the four clusters of FIG. 4b.

The relative membership functions of the four clusters are shown in FIG. 5.

From a mathematical perspective, the FCM clustering model can be described as an optimization problem with constraints. The objective function to be minimized is:

$$J_m(U, V) = \sum_{i=1}^{c} \sum_{k=1}^{N} U_{ik}^m D_{ik}^2 \qquad (5)$$

The following constraints are associated to the function (5):

$$\sum_{i=1}^{c} U_{ik} = 1 \quad \forall k = 1, \ldots, N \qquad (6)$$

In Eq. (5) m is the system fuzzyness degree while $D_{ik}$ matrix represents the distances between distribution points ($X_k$) and cluster centers ($v_i$). For m=0 the fuzzy clusters become classical clusters, that is, each sample belongs only to a cluster. For m>>0 the system fuzzyness level grows. If m→∞ we can observe that the membership degrees of data set points approach to 1/c and cluster centers approach to the distribution center. The FCM algorithm optimizes a criterion which is the "fuzzy" version of the "trace criterion" [2]. The steps of the FCM algorithm may be summarized as follows:

Step 1: Initialization:

Establishing the number of clusters c for the N samples,

Establishing the fuzzyness level m,

Establishing a threshold $\epsilon$, nitializing the matrix of centers and of membership functions.

Step 2: Updating the centers of the clusters:

$$v_i = \frac{\sum_{k=1}^{N} U_{ik}^m x_k}{\sum_{k=1}^{N} U_{ik}^m} \forall i = 1, 2, \ldots, c$$

Step 3: Updating the matrix of membership functions:

$$U_{ik} = \frac{1}{\sum_{j=1}^{c} \left(\frac{D_{ik}}{D_{jk}}\right)^{\frac{2}{m-1}}} \forall i = 1, 2, \ldots c \quad \forall k = 1, 2, \ldots, N$$

Step 4: Stop condition:

If $\|v_{new} - v_{old}\| \leq \epsilon$ or if the maximum number of iterations has been reached;

Otherwise, return to Step 2.

The above algorithm may be executed for several clustering strategies of data set X, that is, for different number of clusters (from $C_{min}$ to $C_{max}$). The final result will be a sequence of $J_{min}(c)$ (with $c = c_{min}, \ldots, c_{max}$), each of them is the function (5) minimum.

There is a performance index P(c), given by Eq. (7), by which it is possible to find the "optimal" number of clusters.

$$P(c) = \tilde{J}_{\min}(c) - \sum_{i=1}^{c} \sum_{k=1}^{N} U_{ik}^{m} \cdot \|\bar{x} - v_i\| \quad (7)$$

The "optimal" number of clusters $C_{opt}$ is one minimizes the performance index P(c).

Figure 6:
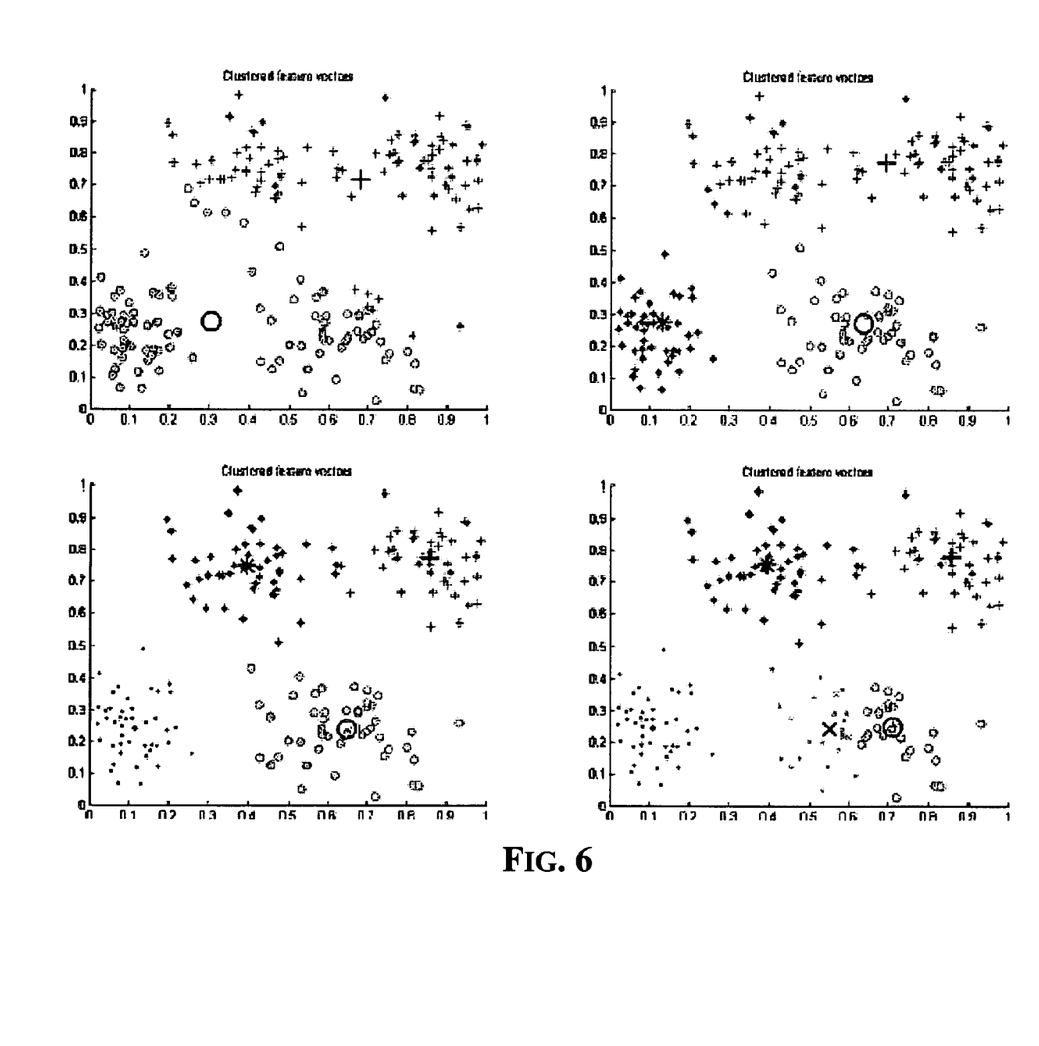

P(c) has a minimum when data set clustering has a minimum intra-cluster variance (i.e. small values of $D_{ik}$ in e $\tilde{J}_{min}(C)$) and a maximum inter-cluster variance (i.e. maximum cluster center distances $v_i$ from data set centers $\bar{x}$). Hence, a graph of the performance index versus the number of clusters may be plot. FIG. 6 shows the a given bi-dimensional data set of FIG. 4a grouped with different numbers of clusters (c=2, . . . , 5).

Looking at FIG. 6 it is easy to see that the best data set clustering is obtained with four clusters.

Figure 7:
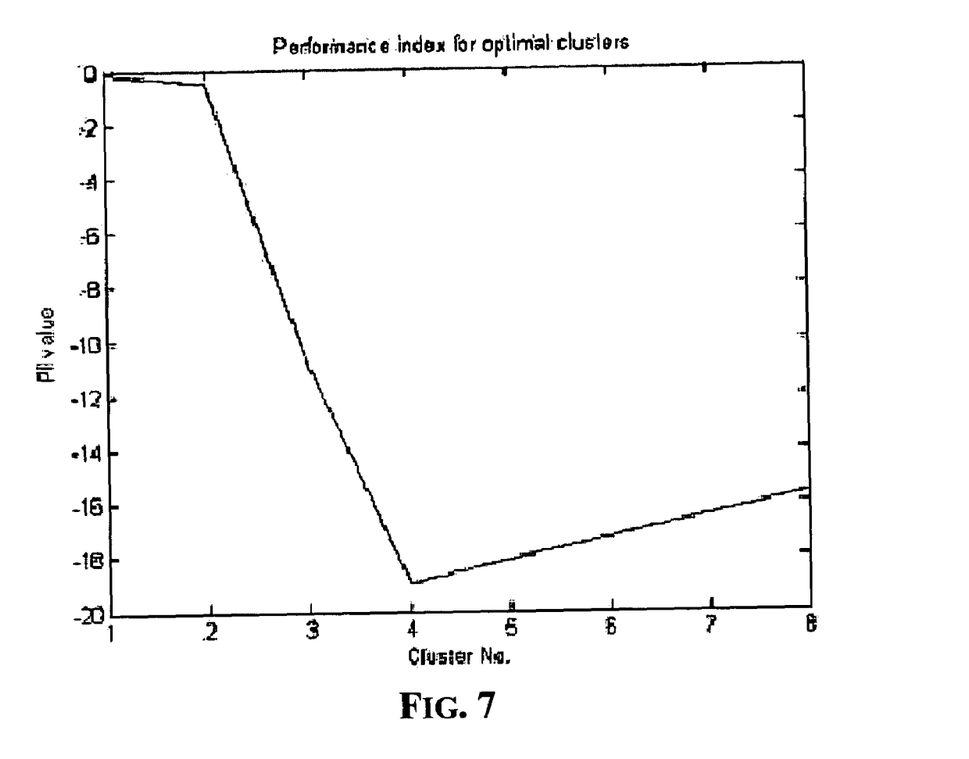
FIG. 7 is a graph of the performance index for the clusterings of FIG. 6.

FIG. 7 shows that the best clustering performance index of the sample data of FIG. 4a is obtained with four clusters.

The advantages of the diagnosis unit of this invention are: it is possible to diagnose misfire and partial combustion conditions directly by sensing the pressure in the combustion chamber without employing highly sensible angular speed sensors; it is not necessary to disable the diagnosis of misfire conditions when the driver is shifting gear, during transients, when traveling on rough road surfaces and so forth; it is relatively easy to identify the cylinder in which the misfire condition has occurred by sensing the combustion pressure in each cylinder and associating a diagnosis unit to each cylinder, thus the control of fuel injection may be more precise; and discrimination of misfire or partial combustion conditions is relatively simple and implemented in real time.

Further background information may be found in the following references: California's OBDII Requirements (1996). (Title 13, California Code of Regulations (CCR), Section1968) Resolution 96-34.

N. Cesario, M., Di Meglio, F. Dirozzi (2005). Realization of a Virtual Lambda Sensor on a Fixed Precision System, *IEEE Proceedings of the DATE05 International Conference*, Munich.

Cesario, N., Lavorgna, M., Taglialatela (2006), F. Soft Computing Mass Air Flow Estimator for a Single-Cylinder SI Engine, *SAE-Paper* 2006-01-0010, Detroit.

Förster, J. et al. (1997). Advanced Engine Misfire Detection for SI-Engines, *SAE-Paper* 970855, Detroit. Heywood, J. B., (1988). *Internal combustion engines fundamentals* (McGraw-Hill Book Company).

Ribbens, W. B., Rizzoni, G. (1990). Onboard Diagnosis of Engine Misfires, SAE-Paper 901768, Detroit. Schmidt, M., Kimmich, F., Straky, H. and Isermann R. (2000). Combustion Supervision by Evaluating Crankshaft Speed and Acceleration, *SAE-Paper* 2000-01-0558, Detroit.

Sellnau, M. C., Matekunas, F. A., Battiston, P. A., Chang, C. F and. Lancaster, D. (2000). Cylinder-Pressure-Based Engine Control Using Pressure-Ratio-Management and Low-Cost Non-Intrusive Cylinder Pressure Sensors, *SAE paper* 2000-01-0932, Detroit. Pal, K., N. R. Pal and J. C. Bezdek (1997). A mixed c-means clustering model. *Proceedings of IEEE International Conference on Fuzzy Systems*, pp. 11-21. Frigui H. and Raghu Krishnapuram (1993). A possibilistic approach to clustering. *IEEE Transactions on Fuzzy Systems*, 1(2) pp. 98-110.

That which is claimed is:

1. A method of diagnosing misfire or partial combustion conditions in an internal combustion engine, the method comprising:

sensing pressure in a combustion chamber of at least one cylinder of the engine, and generating at least one pressure signal based on the sensed pressure;

extracting at least one operation parameter from the at least one generated pressure signal; and producing at least one signal representative of a misfire condition or of a partial combustion condition based on a value of the at least one extracted operation parameter, with the extracted operation parameter corresponding to an instantaneous value of a pressure ratio $p(\theta)/p(-\theta)$, where P is the pressure in the combustion chamber of the at least one cylinder and θ is an angular position of the engine from Top Dead Center, for pre-established angular positions.

2. The method of claim 1, further comprising:

grouping sets of values of the at least one operation parameter in clusters based on processing the grouped sets of values with a clustering algorithm;

estimating a clustering performance index of the said clustering algorithm for each grouped set of values;

calculating a clustering factor as a ratio between the clustering performance index and an ideal performance index; and choosing how many of the clusters are to be grouped so that the execution of the clustering algorithm corresponds to a largest clustering factor being calculated.

3. The method of claim 2, further comprising:

pre-establishing first, second and third disjoint ranges of positive real numbers;

locating a center of gravity of each cluster;

calculating an arithmetic mean of each center of gravity;

asserting that misfire conditions have occurred if at least one of the arithmetic means is contained in the first pre-established range;

asserting that partial combustion conditions have occurred if at least one of the arithmetic means is contained in the second pre-established range; and asserting that normal combustion conditions have occurred if at least one of the arithmetic means is contained in the third pre-established range.

4. A device for diagnosing misfire or partial combustion conditions in an internal combustion engine, the device comprising:

a pressure sensor for sensing pressure in a combustion chamber of at least one cylinder of the engine, and generating at least one pressure signal based on the sensed pressure; and an off-line machine configured to perform the following.

receiving as input the at least one generated pressure signal, extracting at least one operation parameter from the at least one generated pressure signal, and producing at least one signal representative of a misfire condition or of a partial combustion condition based on a value of the at least one extracted operation parameter, with the extracted operation parameter corresponding to an instantaneous value of a pressure ratio $P(\theta)/P(-\theta)$, where P is the pressure in the combustion chamber of the at least one cylinder, and θ is an angular position of the engine from Top Dead Center, for pre-established angular positions.

5. The device of claim 4, wherein said off-line machine comprises:
an identification block for determining the pressure ratio; and
a core block for generating the at least one signal representative of the misfire condition or of the partial combustion condition as a function of the pressure ratio.

6. The device of claim 5, wherein said core block is configured to perform the following:
grouping sets of values of the at least one operation parameter in clusters based on processing the grouped sets of values with a clustering algorithm;
estimating a clustering performance index of the clustering algorithm for each grouped set of values;
calculating a clustering factor as a ratio between the clustering performance index and an ideal performance index; and
choosing how many of the clusters are to be grouped so that execution of the clustering algorithm corresponds to a largest clustering factor being calculated.

7. The device of claim 6, wherein said core block is further configured to perform the following:
pre-establishing first, second and third disjoint ranges of positive real numbers;
locating a center of gravity of each cluster;
calculating an arithmetic mean of each center of gravity;
asserting that misfire conditions have occurred if at least one of the arithmetic means is contained in the first pre-established range; asserting that partial combustion conditions have occurred if at least one of the arithmetic means is contained in the second pre-established range; and
asserting that normal combustion conditions have occurred if at least one of the arithmetic means is contained in the third pre-established range.

8. A method of diagnosing an internal combustion engine comprising:
sensing pressure in at least one cylinder of the engine, and generating: at least one pressure signal based on the sensed pressure;
extracting at least one operation parameter from the at least one generated pressure signal; and
producing at least one signal representative of an engine condition based on a value of the at least one extracted operation parameter, with the extracted operation parameter corresponding to a pressure ratio $P(\theta)/P(-\theta)$, where P is the pressure in the at least one cylinder and $\theta$ is an angular position of the engine with respect to a reference, for pre-established angular positions.

9. The method of claim 8, further comprising grouping sets of values of the at least one operation parameter in clusters based on processing the grouped sets of values with a clustering algorithm;
estimating a clustering performance index of the clustering algorithm for each grouped set of values;
calculating a clustering factor as a ratio between the clustering performance index and an ideal performance index; and
choosing how many of the clusters are to be grouped so that execution of the clustering algorithm corresponds to a largest clustering factor being calculated.

10. The method of claim 9, further comprising:
pre-establishing first, second and third disjoint ranges of positive real numbers;
locating a center of gravity of each cluster;
calculating an arithmetic mean of each center of gravity;
asserting that misfire conditions have occurred if at least one of the arithmetic means is contained in the first pre-established range;
asserting that partial combustion conditions have occurred if at least one of the arithmetic means is contained in the second pre-established range; and
asserting that normal combustion conditions have occurred if at least one of the arithmetic means is contained in the third pre-established range.

11. A device for diagnosing an internal combustion engine comprising;
a pressure sensor for sensing pressure in a combustion chamber of at least one cylinder of the engine, and generating at least one pressure signal based on the sensed pressure; and
an off-line machine configured to perform the following
receiving as input the at least one generated pressure signal,
extracting at least one operation parameter from the at least one generated pressure signal, and
producing at least one signal representative of an engine condition based on a value of the at least one extracted operation parameter, with the extracted operation parameter corresponding to an instantaneous value of a pressure ratio $P(\theta)/P(-\theta)$,
where P is the pressure in the combustion chamber of the at least one cylinder, and $\theta$ is an angular position of the engine with respect to a reference; for pre-established angular positions.

12. The device of claim 11, wherein said off-line machine comprises:
an identification block for determining the pressure ratio; and
a core block for generating the at least one signal representative of an engine condition as a function of the pressure ratio.

13. The device of claim 12, wherein said core block is configured to perform the following:
grouping sets of values of the at least one operation parameter in clusters based on processing the grouped sets of values with a clustering algorithm;
estimating a clustering performance index of the clustering algorithm for each grouped set of values;
calculating a clustering factor as a ratio between the clustering performance index and an ideal performance index; and
choosing how many of the clusters are to be grouped so that execution of the clustering algorithm corresponds to a largest clustering factor being calculated.

14. The device of claim 13, wherein said core block is further configured to perform the following:
pre-establishing first, second and third disjoint ranges of positive real numbers;
locating a center of gravity of each cluster;
calculating an arithmetic mean of each center of gravity;
asserting that misfire conditions have occurred if at least one of the arithmetic means is contained in the first pre-established range;
asserting that partial combustion conditions have occurred if at least one of the arithmetic means is contained in the second pre-established range; and
asserting that normal combustion conditions have occurred if at least one of the arithmetic means is contained in the third pre-established range.

* * * * *

UNITED STATES PATENT AND TRADEMARK OFFICE
CERTIFICATE OF CORRECTION

PATENT NO. : 7,251,990 B2
APPLICATION NO. : 11/367806
DATED : August 7, 2007
INVENTOR(S) : Taglialatela-Scafati et al.

It is certified that error appears in the above-identified patent and that said Letters Patent is hereby corrected as shown below:

Column 7, Line 39  Delete: "$C^N/c!$"
Insert: -- $c^N/c!$ --

Column 8, Line 65  Delete: "$C_{min}$ to $C_{max}$"
Insert: -- $c_{min}$ to $c_{max}$ --

Column 9, Line 9  Delete: "$C_{opt}$"
Insert: -- $c_{opt}$ --

Column 9, Line 13  Delete: "$J_{min}(C)$"
Insert: -- $J_{min}(c)$ --

Column 10, Line 15  Delete: "$p(\theta)/p(-\theta)$"
Insert: -- $P(\theta)/P(-\theta)$ --

Column 10, Line 30  Delete: "that the"
Insert: -- that --

Column 11, Line 30  Delete: "range; asserting that partial combustion"
Insert: -- range;
        asserting that partial combustion --

Column 11, Line 40  Delete: "generating:"
Insert: -- generating --

Signed and Sealed this

Twenty-ninth Day of April, 2008

JON W. DUDAS
*Director of the United States Patent and Trademark Office*